United States Patent [19]

Gilman

[11] Patent Number: 5,451,177
[45] Date of Patent: Sep. 19, 1995

[54] TUBE TOY AND METHOD

[75] Inventor: Bruce C. Gilman, Houston, Tex.

[73] Assignee: Table Toys, Inc., Houston, Tex.

[21] Appl. No.: 326,278

[22] Filed: Oct. 20, 1994

[51] Int. Cl.⁶ ...................... A63H 33/08; A63H 33/04
[52] U.S. Cl. ...................................... 446/128; 446/89; 403/338
[58] Field of Search ............... 446/128, 127, 124, 118, 446/119, 89, 85, 120, 121, 168; 403/335, 338

[56]        References Cited
        U.S. PATENT DOCUMENTS

| | | | |
|---|---|---|---|
| 3,205,611 | 9/1965 | Onanian | 446/119 X |
| 3,221,439 | 12/1965 | Schaper . | |
| 3,302,949 | 2/1967 | Wolfe | 446/89 X |
| 3,544,138 | 12/1970 | Von Eiff | 403/338 X |
| 4,452,097 | 6/1984 | Sunkel | 403/338 X |
| 5,055,081 | 10/1991 | Nayak | 446/118 X |
| 5,112,263 | 5/1992 | Penillard et al. | 446/89 |
| 5,344,143 | 9/1994 | Yule . | |

FOREIGN PATENT DOCUMENTS

| | | | |
|---|---|---|---|
| 2427835 | 2/1980 | France | 446/118 |
| 1066466 | 10/1959 | Germany | 446/120 |
| 2902267 | 1/1979 | Germany . | |
| 385086 | 2/1965 | Switzerland | 446/128 |
| 679279A | 10/1989 | Switzerland . | |
| 8704365 | 7/1987 | WIPO . | |

OTHER PUBLICATIONS

Flexitoys; Flexiblocks; 1994; Bulletin No. A594.
Constructive Playthings, Pre-Holiday 1994; First Learning; Beginning Bead Mazes, Step I Maze—No. ANA-04L; Step II Maze—No. ANA-20 L.
Back to Basic Toys, Holiday '94/Spring '95; Jumbo Ball Maze—Item #754, p. 9; Bead Maze Table—Item #757, p. 24; Block and Marbles—Item #'s 241 and 242, p. 34; The Classic Bead Maze—Item #40, p. 43; K'nex Giant Roller Coaster Set—Item #880, p. 50.
Mottik; Welcome to the World of Mottik . . . ; specific date unknown, at least as early as Jan. '94.
Whistlin' Dixie; Kids At Work; specific date unknown, at least as early as Jan. '94.
Brik Toy Company; Basic Giant Building Blocks Plus; specific date unknown, at least as early as Jan. '94.
Playskool, Inc.; Tinkertoy Construction System; specific date unknown, at least as early as Jan. '94.
Arlington-Hews, Inc.; Now, You Can Googolplex In Four Different Ways!; specific date unknown, at least as early as Jan. '94.
Connector Set Toy Company; K'nex Helicopter; 1992.
Playskool, Inc.; Tinkertoy Construction Systems; 1991.
Arlington-Hews, Inc.; Googolplex, The Space Building toy; 1990.
SIFO Funblocks; Nos. 47/48; date unknown.

Primary Examiner—Robert A. Hafer
Assistant Examiner—D. Neal Muir
Attorney, Agent, or Firm—Vaden, Eickenroht, Thompson & Feather

[57]           ABSTRACT

A plurality of tubes having flanged ends are assembled in end to end fashion by clamping the flanges between first and second portions of connector blocks, the portions of the connector blocks being provided with channels formed in the opposed surfaces thereof for defining a passage through the connector block when assembled to each other and a groove in the channel formed in the opposed surfaces for receiving the flanges formed around the ends of the tubes. Each of the portions of the connector blocks is provided with complementary projections and recesses for frictionally engaging one portion to the other and for frictionally engaging the connector blocks to the pieces of a multiple piece, snap-together, children's building toy set.

14 Claims, 3 Drawing Sheets

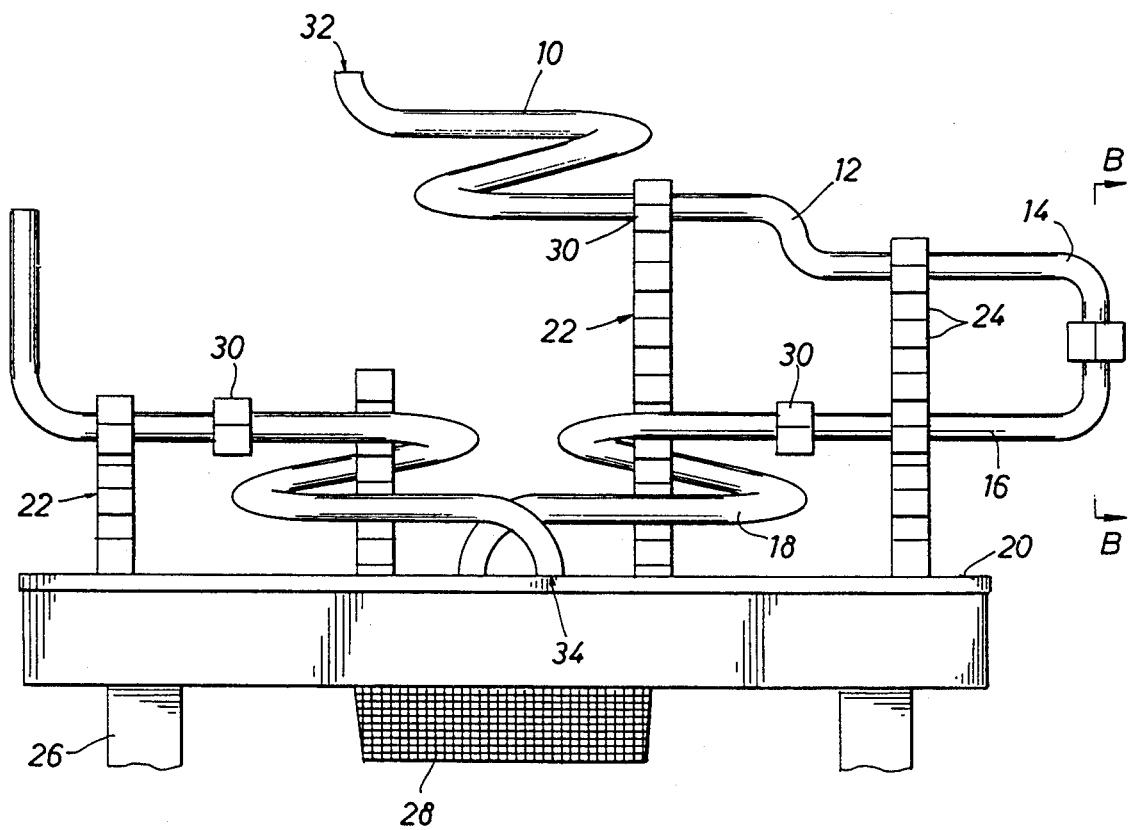
FIG. 1
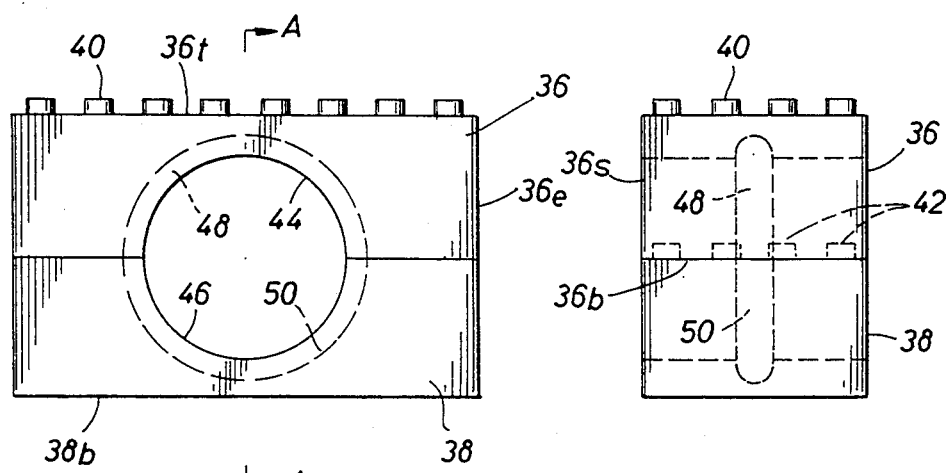
FIG. 2
FIG. 3

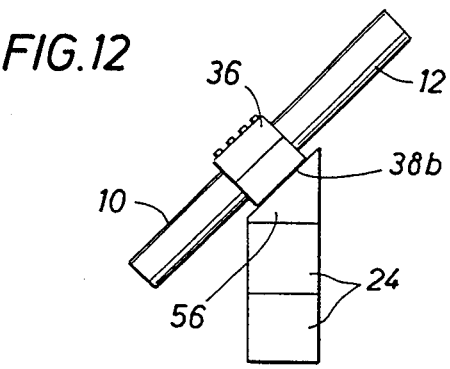
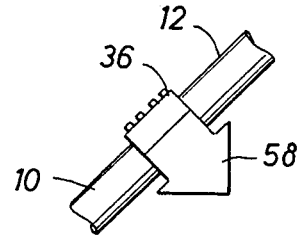
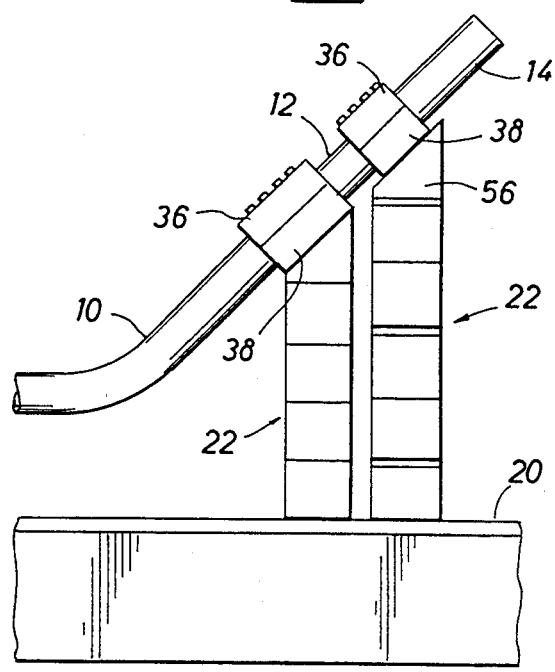
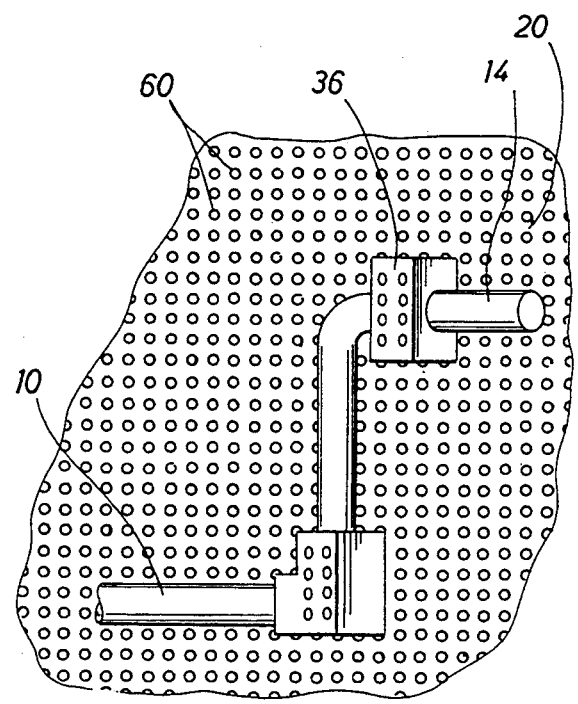
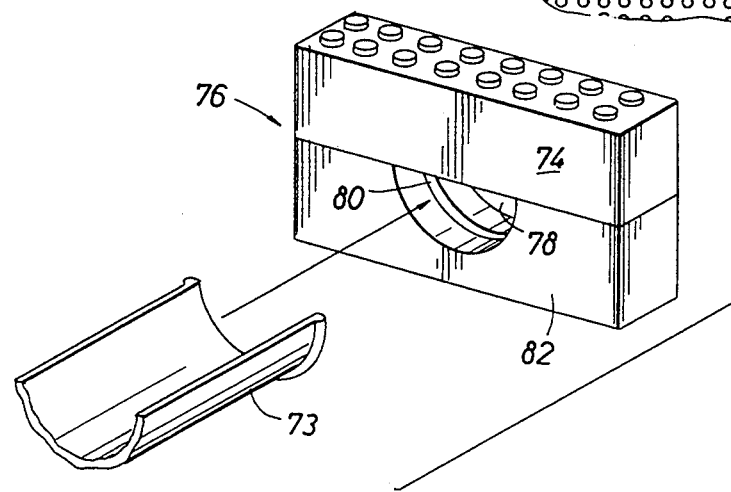

TUBE TOY AND METHOD

BACKGROUND OF THE INVENTION

The present invention relates to a tube toy including a run, track, or tube for marbles, balls, and other toys which includes a vertical component through which the toys will travel under the influence of gravity. In more detail, the present invention relates to a tube toy for use with a multiple piece, snap-together children's building toy of the type having complementary projections and recesses on each piece for supporting a plurality of tubes assembled in end to end fashion to form a continuous track or tube or combination thereof through which marbles, balls and other toys travel under the influence of gravity.

Various toys are available which include component parts which form a track or path to allow movement along that path in three dimensions. Examples include the many marble race and bead mazes that are currently on the market. Marble race toys are shown in U.S. Pat. No. 5,344,143 and the patents listed in the Background section of that patent. Bead mazes generally include one or more wires along which one or more wooden or plastic beads are pushed, the wires defining a fixed path which often loops and/or is intertwined with other such wires such as is shown on page 13 of the Pre-holiday 1994 catalog of Constructive Playthings (Grandview, Mo.).

Also known are children's multiple piece, snap-together building sets such as those available under the trademarks LEGO, DUPLO, TINKER TOY, BRIK, K'NEX, FLEXIBLOCKS, and TYCO. One of the objects of the present invention is to combine the many attributes of this type of construction toy with the motion provided by bead mazes and marble runs, and in particular, to provide that combination in a toy adapted for erection and support on, for example, the building block tables made and sold by Table Toys, Inc. (Houston, Tex.) under the TABLE TOYS trademark.

It is another object of the present invention to provide a toy in which the tubes or tracks can be assembled to provide a continuous, long run through which marbles, balls, and other children's toys will run under the influence of gravity.

Another object of the present invention is to provide a tube toy which, like the multiple piece, snap-together building sets described above, teaches manual dexterity, spatial relationships, and construction principles to the children who play with it.

These and many other objects of the present invention will be made clearer to those skilled in the art by the following description of the preferred embodiments thereof.

SUMMARY OF THE INVENTION

These objects are met by providing a tube toy comprising first and second elongate tubes having flanges formed around the ends thereof and first and second members having opposed surfaces shaped so as to define a passage through the block which is formed when the first member is assembled to the second member with the opposed surfaces adjacent each other. A groove is formed in the opposed surfaces for receiving the flanges around the ends of the first and second tubes to clamp the first tube to the second tube in end-to-end relationship when the first member is assembled to the second member.

In another embodiment, the present invention is a tube toy for use with a children's toy having multiple pieces, each of the pieces being provided with complementary recesses and projections which snap together for forming multiple shapes, comprising first and second elongate tubes having flanges formed at the ends thereof and a connector block for assembling an end of the first tube to an end of the second tube to form an elongate track. The connector block comprises first and second portions with projections and recesses formed thereon for frictionally engaging the complementary recesses and projections of the pieces of the children's snap-together toy and each other, each of the first and second portions of the connector block being provided with a channel. The walls of the channels are shaped so that, when the first and second portions of the connector block are assembled to each other, the channels form a passage through the connector block having a shape which approximates the shape of the elongate tubes. A groove is formed in the wall of each channel for receiving the flanges of the first and second tubes to clamp the tubes together when the first and second portions of the connector block are frictionally engaged to each other with the tubes positioned in the passage through the connector block.

Also provided is a method of assembling the above described tube toy for use with a children's building toy set having multiple pieces. The method comprises the steps of positioning first and second elongate tubes having flanges formed around the ends thereof in abutting end to end relationship, and assembling a connector block having a passage therethrough about the abutting ends of the first and second elongate tubes to clamp said tubes together. The connector block comprises first and second portions with projections and recesses formed thereon for frictionally engaging the complementary recesses and projections of the pieces of the children's building toy set and each other. Each of the first and second portions of the connector block is provided with opposed surfaces shaped so as to define the passage through the connector block, with the passage approximating the shape of the elongate tubes when the first portion is assembled to the second portion. A groove is formed in the opposed surfaces of the first and second connector block portions and the flanges of the first and second elongate tubes are positioned in the grooves to clamp the tubes together when the opposed surfaces of the first and second portions are adjoined by frictionally engaging the complementary recesses and projections of the first and second portions to each other with the first and second elongate tubes being positioned in the passage through the connector block.

BRIEF DESCRIPTION OF THE DRAWINGS

FIG. 1 is a side elevational view of a preferred embodiment of the tube toy of the present invention erected on a table top.

FIG. 2 is a side elevational view of one of the connector blocks of the tube toy of FIG. 1.

FIG. 3 is an end elevational view of the connector block of FIG. 2.

FIG. 12 is a side elevational view of a portion of the tube toy of FIG. 1 as assembled in a configuration other than that shown in FIG. 1.

FIG. 13 is a side elevational view of yet another alternative embodiment of the connector block of FIG. 2.

FIG. 14 is a side elevational view of the tube toy of the present invention as assembled on a table top in a configuration different than that shown in FIG. 1 and which combines multiple elements of the various parts of the tube toy shown with another embodiment of the connector block of the present invention.

FIG. 15 is a top plan view of the tube toy of FIG. 14.

FIG. 16 is a perspective view of an alternative embodiment of the tube and connector block of the present invention.

DETAILED DESCRIPTION OF THE PREFERRED EMBODIMENT

Figure 4:
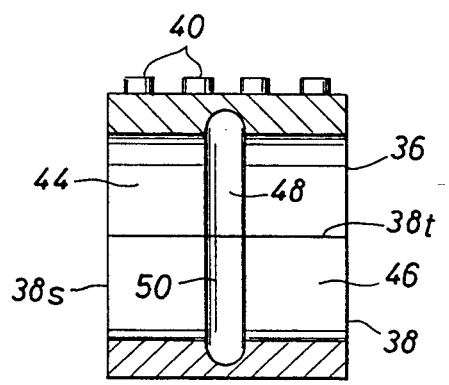
FIG. 4 is a sectional view of the connector block of FIG. 2 taken along the line A—A in FIG. 2.

Referring now to the figures, a typical configuration of a preferred embodiment of the tube toy of the present invention is shown in FIG. 1. The tube toy is comprised of a plurality of elongate tubes which may be straight, curved, bent or formed with a right angle in them, or formed in any other shape, five of which are numbered at reference numerals 10, 12, 14, 16, and 18. The tubes 10, 12, 14, 16, and 18 are supported on a table top 20 by towers 22 formed of individual, vertically stacked pieces 24 of a multiple piece, snap-together children's building toy of the type sold under several trademarks such as DUPLO, TYCO, LEGO, BETTER BLOCKS, and the like. The tubes, or at least portions thereof, may be oriented horizontally, vertically, or at virtually any angle throughout the three-dimensional space that resides above and about the table top 20 and, although relatively rigid in the embodiment shown, may also be formed of a flexible material such as plastic. The table top 20 is preferably the top of a table of the type sold under the TABLE TOYS trademark, which includes a top having a plurality of projections (not numbered) sized to frictionally engage complementary recesses formed in the pieces of such multiple piece, snap-together toys, legs 26, and a central storage bag 28 for storing the individual pieces of the snap-together toy set while not in use. The individual elongate tubes 10, 12, 14, 16, and 18 are assembled end-to-end by a plurality of connector blocks 30 as described in more detail below to form a long, continuous tube through which balls, marbles, and other toys will pass under the influence of gravity from a first, upper open end 32 to a second, lower open end 34 (in the embodiment shown in FIG. 1, the lower open end 34 is actually below the table top 20 and positioned in a hole (not shown) in the table top 20 so that objects traveling through the long tube will drop into the bag 28).

The connector block 30 is shown in more detail in FIGS. 2–5. Each connector block is formed of first and second portions, or members 36 and 38 having top, bottom, side, and end surfaces $36/38_t$, $36/38_b$, $36/38_s$, and $36/38_e$, respectively. Each of the top surfaces $36_t$ and $38_t$ and bottom surfaces $36_b$ and $38_b$ of members 36 and 38 are provided with projections 40 and complementary recesses 42 which not only receive the projections 40 and frictionally engage the other member 36 and 38 when assembled thereto, but are also sized and configured so as to frictionally engage the recesses and projections (not shown) of the pieces of the multiple piece, snap together building set of the types described above. Those skilled in the art will recognize from this disclosure that the recesses and projections on connector block 30 can be shaped so as to receive and/or engage the complementary projections and recesses of any multiple piece building set. The bottom surface $36_b$ of first member 36 and the top surface $38_t$ of second member 38, e.g., the surfaces which are opposed when the portions 36 and 38 are assembled to form connector block 30, are provided with channels 44 and 46, respectively, which form a passage (not numbered) through the connector block 30 when the first member 36 is assembled to the second member 38 by frictional engagement of the complementary recesses 42 and projections 40 of each member.

Figure 5:
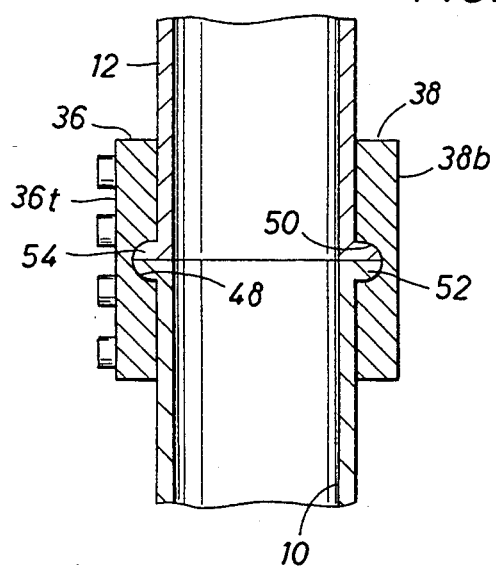
FIG. 5 is a longitudinal sectional view of a portion of the tube toy of FIG. 1 taken along the line B—B in FIG. 1.
Figure 6:
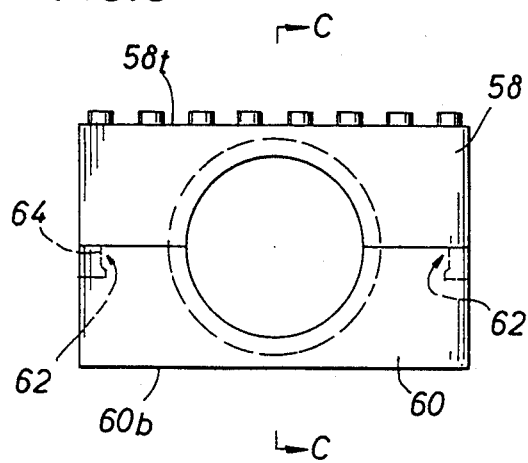
FIG. 6 is a side elevational view similar to FIG. 2 of an alternative embodiment of the connector block of the present invention.
Figure 7:
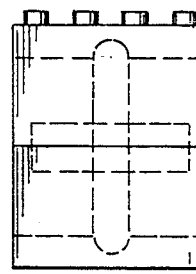
FIG. 7 is an end elevational view of the connector block of FIG. 6.
Figure 8:
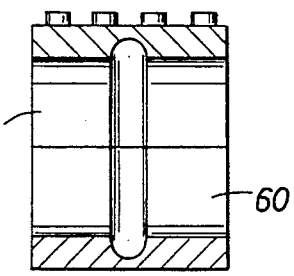
FIG. 8 is a sectional view of the connector block of FIG. 6 taken along the line C—C in FIG. 6.

Arcuate grooves 48 and 50 are formed in the surfaces of the first and second members 36 and 38 which form the walls of the respective channels 44 and 46, and in the preferred embodiment shown, the center point (not shown) of the arc defined by the arcuate grooves 48 and 50 is coincident with the axis of the substantially cylindrical passage traversing connector block 30. As shown in FIG. 5, the ends of the elongate tubes 10 and 12 are each provided with flanges 52 and 54, respectively. The tubes 10 and 12 are positioned in the passage formed by the assembled first and second members 36 and 38 with the flanges 52 and 54 of each tube 10 and 12 received within the grooves 48 and 50, the grooves 48 and 50 preferably being continuous around the inside wall of the passage formed when the first and second members 36 and 38 are assembled to each other. In this manner, the flanges 52 and 54 are clamped together between first and second members 36 and 38 and the tubes 10 and 12 assembled to each other in end to end fashion to form a long, continuous tube.

This assembly is better illustrated in FIGS. 12–14, which also illustrate a wedge block 56 with recesses and complementary projections (not shown) formed on the bottom and top surfaces for frictionally engaging the recesses on the bottom surface $38_b$ of second member 38 and the top surface of one of the pieces 24 of the above-described children's snap-together, multiple piece building toy sets. As shown in FIGS. 12 and 14, the top surface of the wedge block 56 is angled at approximately 45° relative to the bottom and/or side surfaces of the wedge block 56 to allow two tubes 10 and 12 to be joined at an angle of 45° relative to horizontal. Thus, the tube ends need not be oriented horizontally or vertically, as depicted in FIG. 1, to be joined by connector blocks 30.

The component parts of the tube toy of the present invention may include a number of changes which are intended to fall within the scope of the invention. For instance, two alternative embodiments of the connector block of the present invention are shown in FIGS. 6–11. The opposed surfaces of first and second members 58 and 60 comprising connector block 62 (FIGS. 6–8) are provided with a deformable snap fitting for frictionally retaining the first and second members 58 and 60 to each other. The snap fitting is provided by the opposed Z-snaps 62 formed in the opposed surfaces 58$_b$ and 60$_t$ of members 58 and 60, respectively, the material comprising members 58 and 60 being resilient enough to allow the edges 64 to pass each other when pressure is exerted on the surfaces 58$_t$ and 60$_b$ and to positively engage the members 58 and 60 to each other.

Figure 9:
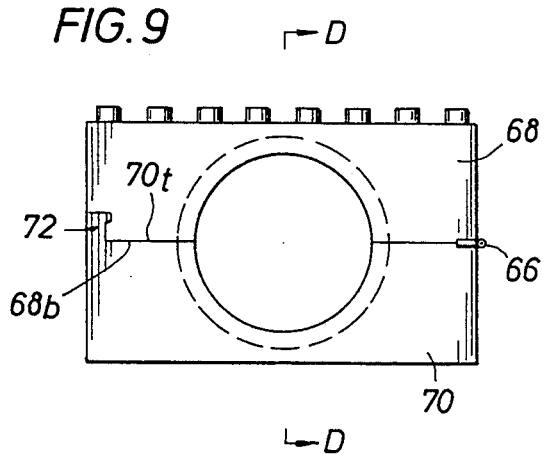
FIG. 9 is a side elevational view similar to FIG. 2 of yet another alternative embodiment of the connector block of the present invention.
Figure 10:
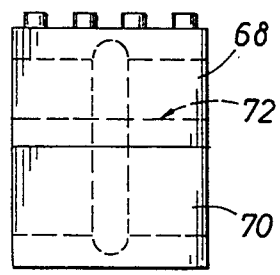
FIG. 10 is an end elevational view of the connector block of FIG. 9.
Figure 11:
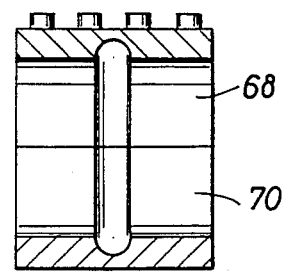
FIG. 11 is a sectional view of the connector block of FIG. 9 taken along the line D—D in FIG. 9.

Referring to a second alternate embodiment shown in FIGS. 9–11, the deformable snap fitting is provided by a hinge 66 which connects the opposed surfaces 68$_b$ and 70$_t$ to each other and the Z-snap 72 formed in those same surfaces. Hinge 66 is a thin strip of the same material which comprises the members 68 and 70 which is flexible enough to allow the members 68 and 70 to open and close around the tubes 10, 12, 14, 16, and 18.

It will also be recognized that the tubes 10, 12, 14, 16, and 18 need not be round in cross section; they can also be formed in elliptical cross section or as sections of a track, i.e., in a semicircular cross section, the latter being shown at reference numeral 73 in FIG. 16. If in this semicircular configuration, those skilled in the art who have the benefit of this disclosure will recognize that the first member 74 of connector block 76 need not have a channel such as the channel 44 and groove such as the groove 48 formed in the bottom surface 36$_b$ of the second portion 36 of connector block 30; instead, one of the pieces of the multiple piece building set such as the rectangular piece shown at reference numeral 74 is simply used to clamp the flanges of the abutting track sections into the passage formed by the channel 78 and groove 80 in the second portion 82 of connector block 76 by frictional engagement of the recesses in piece 74 by the complementary projections on the second portion 82. Another example of an alternative embodiment is illustrated in FIG. 13, in which the second member 38 of the connector block 30 of FIGS. 2–5 and the above-described wedge block 56 (FIG. 12) are effectively combined into a single piece 58 with an upper surface which, like the upper surface of wedge block 56, is angled at approximately 45°. A first member such as the member 36 shown in FIGS. 2–5 is then assembled to the member 58 by frictional engagement of the complementary projections and recesses formed on each.

FIGS. 14 and 15 illustrate how the various component parts of the tube toy of the present invention are assembled on a table top 20 of the type described above. In FIG. 15, the projections on the table top 20 are shown at reference numeral 60 to make clear the manner in which the tube toy of the present invention effectively integrates the products of the various manufacturers listed herein, i.e., by providing support by frictional engagement for the towers 22 formed of the pieces 24 of the multiple piece building toy which are topped by wedge blocks 56 for supporting connector blocks 30 which clamp several tube sections together to form a continuous elongate tube. Note that long lengths of the tubes 10, 12, 14, 16, or 18 can be supported (between abutting joints) by a tower such as the tower 22 topped by either a wedge block 56 or a second member 38 without the need for a first member 36.

Although described in terms of the preferred embodiments illustrated herein, those skilled in the art will recognize from this description that certain changes may be made to the component parts comprising the present invention which do not depart from the manner in which those parts function to attain their intended result. To illustrate such changes, reference is made to the three preceding paragraphs, which describe changes in the structure of the tubes and the connector blocks which as shown in the drawings. Likewise, the recesses and projections described can be shaped in different configuration to allow the connector block to mate, or frictionally engage, the pieces of building sets other than those listed. Another example of such a change appears in FIG. 15 in which one of the connector blocks is shown in the form of a right angle when viewed from above (the angle formed could also be 30°, 45°, 60°, etc.) It is apparent from these many changes that the drawings are furnished for purposes of exemplification to meet the requirement of the Patent Statute, and not to set the limits of the invention. All such changes are intended to fall within the spirit and scope of the present invention as it is defined in the following claims.

What is claimed is:

1. A tube toy for use with a multiple piece children's building toy set, each piece of said set having complementary recesses and projections for frictionally engaging other pieces, comprising:

first and second elongate tubes having flanges formed around the ends thereof;

first member having projections on one of the exterior surfaces thereof and a second member having recesses in one of the exterior surfaces thereof, the projections and recesses engagable with complementary recesses and projections, respectively, of the pieces of a children's multiple piece building toy set, said first and second members further having opposed surfaces shaped so as to define a passage through the block which is formed when said first member is assembled to said second member; and a groove about said passage formed in the opposed surfaces of said first and second members for receiving the flanges around the ends of said first and second tubes to clamp said first tube to said second tube when said first member is assembled to said second member with said first and second tubes assembled between said members.

2. The toy of claim 1 wherein said groove is continuous around the opposed surfaces of said first and second members, thereby forming an annular ring around the passageway formed when said first and second members are assembled to each other.

3. The toy of claim 1 wherein the opposed surfaces of said first and second members are shaped so that the passage through the block that is formed when said first and second members are assembled to each other is shaped so as to approximate the cross-sectional shape of said tubes.

4. The toy of claim 1 wherein said first member is assembled to said second member by frictional engagement.

5. The toy of claim 1 wherein said first member is assembled to said second member by a deformable snap fitting formed in the opposed surfaces thereof.

6. The toy of claim 1 wherein said first member is hinged to said second member.

7. A toy for use with a multiple piece children's building toy set, each piece of said multiple piece children's building toy set having complementary recesses and projections for frictionally engaging other pieces, comprising:
- first and second elongate tubes having a flange formed around each end thereof;
- first and second members having top, bottom, and side surfaces with recesses formed in the bottom surfaces and complementary projections formed in the top surfaces, each of the recesses formed in the bottom surfaces and the projections formed in the top surfaces being shaped to frictionally engage the complementary recesses and projections of the pieces of said children's multiple piece building toy set;
- a channel formed in each of the top surface of said first member and the bottom surface of said second member and forming a passage through the block that is formed when said first and second members are assembled to each other by frictional engagement of the complementary projections in the top surface of said first member to the recesses in the bottom surface of said second member; and
- a groove formed in the channels of each of said first and second members for receiving the flange formed around the ends of each of said tubes to clamp the ends of said first and second tubes together when said first and second members are assembled to each other.

8. The toy of claim 7 wherein the channels in each of said first and second members are shaped so that the shape of the passage through the block that is formed when said first and second members are assembled to each other approximates the cross-sectional shape of said first and second tubes.

9. The toy of claim 7 wherein said groove is arcuate with the center point of the arcuate groove being coincident with the axis of the cylinder defined by the passage through the block that is formed when said first and second members are assembled to each other.

10. A tube toy for use with a children's building toy set having multiple pieces, each of the pieces being provided with complementary recesses and projections which snap together for forming multiple shapes, comprising first and second elongate tubes having flanges formed at the ends thereof and a connector block for assembling an end of said first elongate tube to an end of said second elongate tube to form an elongate track, said connector block comprising:
- first and second portions with projections and recesses formed thereon for frictionally engaging the complementary recesses and projections of the pieces of said children's building toy set;
- each of the first and second portions of said connector block being provided with a channel, the wall of each channel being shaped so that, when the first and second portions are assembled to each other so that the channels form a passage through said connector block, the passage is shaped so as to approximate the shape of said elongate tubes; and
- a groove formed in the wall of each channel for receiving the flanges of the first and second elongate tubes to clamp said first and second elongate tubes together when the first and second portions of said block are frictionally engaged to each other with said first and second elongate tubes positioned in the hole through said connector block.

11. The tube toy of claim 10 wherein the channels are formed in the surfaces of the first and second portions of the connector block which are opposed when assembled.

12. The tube toy of claim 10 wherein said groove is an arcuate groove having a center point substantially coincident with the axis of the cylinder defined by the passage.

13. The tube toy of claim 10 wherein said passage is substantially cylindrical.

14. A method of assembling a tube toy for use with a children's building toy set having multiple pieces, each of the pieces being provided with complementary recesses and projections which snap together for forming multiple shapes, comprising the steps of:
- positioning flanges formed about the ends of first and second elongate tubes in abutting end-to-end relationship in a groove formed in a surface of a first portion of a connector block that opposes a complimentarily grooved surface of a second portion of the connector block; and
- assembling the connector block about the abutting ends of the first and second elongate tubes to clamp the first and second tubes together by frictionally engaging the second portion of the connector block to the first portion thereof, one of the first and second portions being provided with projections formed thereon and the other of the first and second portions being provided with recesses formed therein for frictionally engaging the complementary recesses and projections of the pieces of the children's building toy set, the opposed surfaces of the first and second portions being shaped so as to define a passage through the connector block within which the first and second elongate tubes are clamped.

* * * * *